Dec. 3, 1946.    E. F. W. ALEXANDERSON    2,412,027
CONTROL SYSTEM
Filed May 23, 1936
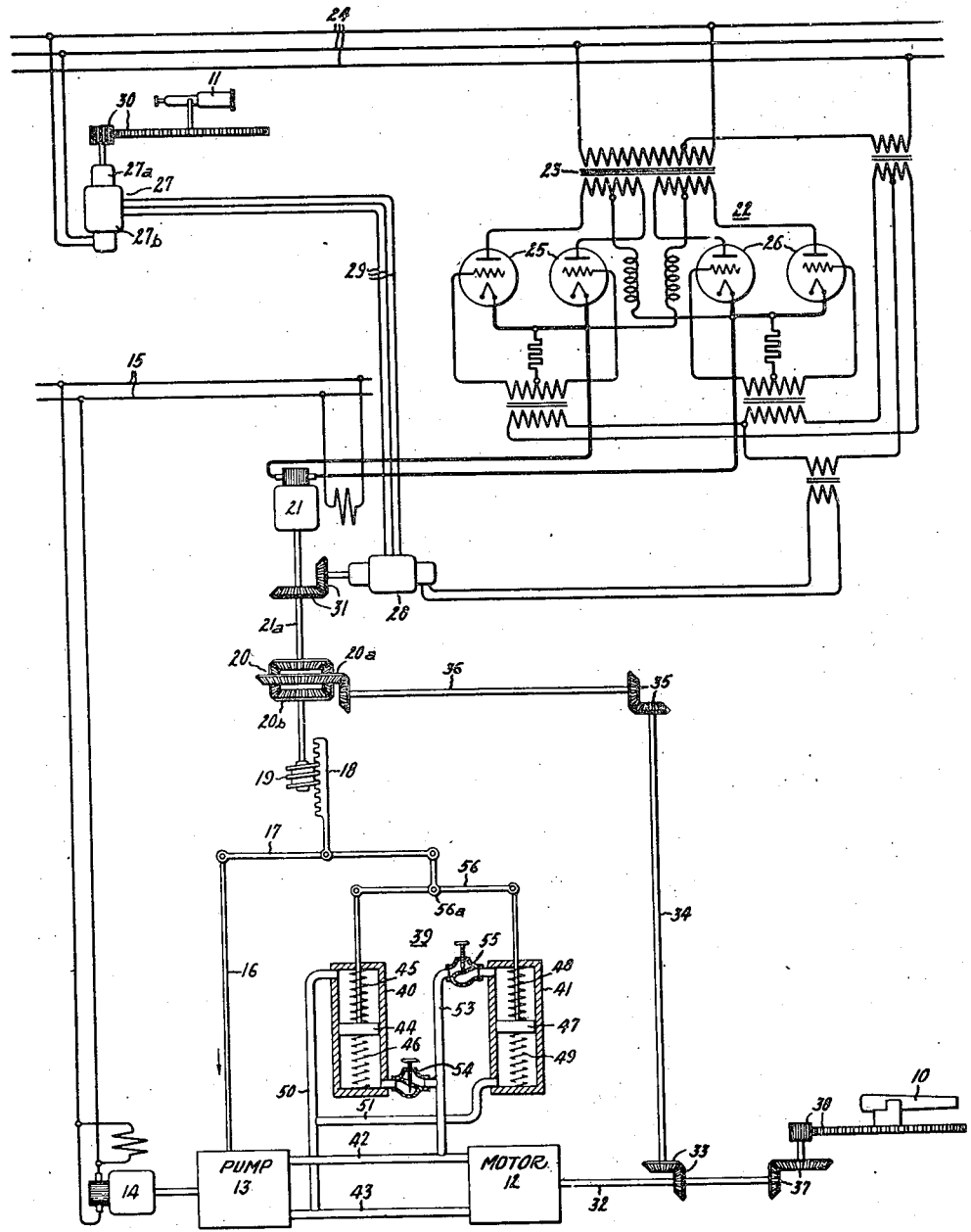
Inventor:
Ernst F. W. Alexanderson.
by Harry E. Dunham
His Attorney.

Patented Dec. 3, 1946

2,412,027

UNITED STATES PATENT OFFICE 2,412,027

CONTROL SYSTEM

Ernst F. W. Alexanderson, Schenectady, N. Y., assignor to General Electric Company, a corporation of New York Application May 23, 1936, Serial No. 81,426

12 Claims. (Cl. 60—53)

This invention relates to control systems, more particularly to control systems for controlling an hydraulic motor to drive an object in positional agreement with a pilot device, and an object of the invention is the provision of a simple reliable and improved system of this character.

Such systems are commonly referred to as "follow-up" systems or torque amplifiers. An example of a system of this character is one in which a heavy object possessing large inertia is to be driven in correspondence with a light, easily movable device such as a telescope. The large inertias of the driven object and driving means, and the high accuracies required lead to instability and to a condition of violent accumulative oscillations, usually referred to as "haunting." This, of course, is most undesirable.

In any synchronous system, the problem is to drive a shaft with considerable power in accurate correspondence with a master device. One way to accomplish this electrically is to couple the output shaft to a synchronous motor and the master shaft to a synchronous generator. The synchronous motor drive has a point of correspondence, and a departure from this point of correspondence causes energy to flow in the electric circuit that produces a torque proportional to the displacement from correspondence. In electrical terms this is known as "phase displacement," but in order to avoid confusion this displacement is hereinatfer referred to as "angular displacement," because this concept is more comparable with the mechanical angle of the hydraulic system.

One aspect of the hydraulic problem in follow-up systems is to cause an hydraulic motor to develop a torque that is proportional to angular displacement. In either the electrical system or the hydraulic system the action is the same as though the output shaft and the master shaft were connected together with a spring that delivers the same torque at the same angular displacement. Such an arrangement, whether it be a spring, an electric motor or an hydraulic motor has a tendency to be oscillatory with a natural period depending upon the synchronizing torque and the mass connected to the output shaft.

In carrying the invention into effect in one form thereof, the driven object is driven by suitable hydraulic driving means comprising a fluid motor connected to the driven object and a pump for supplying fluid under pressure to the motor. Means are provided for controlling the supply of fluid to the motor, and means responsive to the positional disagreement between a pilot device and driven object are provided for actuating the control means to cause the motor to drive the driven object toward correspondence with the pilot device. In order to prevent hunting, means responsive to the rate of change of the torque of the driving means are provided for effecting an actuation of the control means in the opposite direction from that produced by the means responsive to positional disagreement. Since the torque of the hydraulic motor is a function of the pressure of the fluid supplied thereto, the rate of change of torque responsive means may take the form of a device responsive to the rate of change of pressure of the system.

In illustrating the invention in one form thereof, it is shown as embodied in a system for controlling the driving of a gun in positional agreement with a telescope. It will be understood, however, that the invention has other applications.

For a better and more complete understanding of the invention, reference should now be had to the following specification and to the accompanying drawing, the single figure of which is a simple diagrammatical representation of an embodiment of the invention.

Referring now to the drawing, an object such as the gun 10 is to be driven in accurate correspondence with a pilot device, such as the telescope 11.

The gun 10 is driven by suitable hydraulic driving means such as the fluid motor 12 whose output shaft is connected to gun 10. Any suitable fluid, such as oil, is supplied under pressure to the motor from a pump 13 that is driven, at a speed that is preferably substantially constant, by suitable driving means illustrated as an electric motor 14. Although motor 14 may be of any suitable type, it is illustrated as a direct current type motor and is supplied with power from a suitable direct current source represented by the supply lines 15.

The pump 13 is shown conventionally because its structure forms no part of the invention. This pump is preferably a positive displacement type pump and it may be either a constant stroke pump or a variable stroke pump. In either case, means actuated by the connecting rod 16 are provided for controlling the supply of fluid to the motor. If the pump is a constant stroke type of pump, it is provided with a pressure relief valve to prevent building up destructive pressure. If the pump is a variable stroke pump, the control means actuated by the connecting rod 16 may be any suitable device for varying the stroke such as a pivoted tilting box carrying either the pump pistons or the cylinders. Suitable pumps of each of the types mentioned are available on the market. For the purposes of the present invention, it is sufficient to understand that the pump 13 supplies a volume of fluid to the motor 12 and that the control means actuated by connecting rod 16 varies the volume of fluid supplied to the motor.

The connecting rod 16 is connected through suitable means, illustrated as a lever 17, a rack and pinion 18, 19, and a mechanical differential device 20, to a pilot motor 21. This motor is illustrated as a direct current type of motor supplied from suitable electric valve apparatus 22 which in turn is supplied through a supply transformer from a suitable source of alternating voltage represented by the supply lines 24. The valve apparatus 22 comprises two pairs of valves 25, 26. Each pair of valves is connected for full wave rectification, and has its output circuit connected to the armature of motor 21. The pair of valves 25 when energized supplies current to motor 21 in one direction and the other pair when energized supplies current in the reverse direction, and thus when either pair of valves is energized the motor 21 is energized for rotation in a corresponding direction.

For the purpose of controlling the energization of the electric valve apparatus, suitable rotary induction apparatus is provided. This apparatus which is similar to electrical motion transmitting apparatus comprises an electrical transmitting device 27 and an electrical receiving device 28. The transmitter 27 has a rotor member 27a provided with a single phase winding (not shown) and a stator member 27b having a three element winding (not shown) that is physically similar to a three-phase winding. The receiver 28 is identical with the transmitter. As shown, the rotor winding of the transmitter is connected to the upper and middle supply lines 24, the stator windings of the two devices are connected together by means of conductors 29, and the rotor winding of receiver 28 is connected to the grid or input circuit of the electric valve apparatus. The rotor member 27a of the transmitter is connected through gearing 30 to the pilot device, i. e., telescope 11, and the rotor member of the receiver 28 is connected through gearing 31 to the shaft of motor 21.

When telescope 11 and the shaft of motor 21 are in positions of correspondence no voltage is supplied through transmitter 27 and receiver 28 to the grid or input circuit of the electric valve apparatus 22. As a result, the valve apparatus is deenergized and the motor 21 is at rest. When the telescope 11 is rotated in either direction, a voltage is supplied to the grid circuit of the valve apparatus, which energizes one or the other of the pairs of valves, depending on the direction of rotation. This causes the motor to rotate in a corresponding direction, thereby rotating the rotor member of receiver 28 toward a position of correspondence with telescope 11. When this position of correspondence is reached the valve apparatus becomes deenergized and motor 21 comes to rest. The load on motor 21 is so small that the velocity lag between the motor 21 and the telescope is negligible. In other words, the shaft of motor 21 is always in substantial correspondence with telescope 11 both when the telescope is moving and when it is at rest.

As pointed out in the foregoing, the connecting rod 16 is connected to the motor 21, so that when the latter rotates, the rod 16 is moved to actuate the control mechanism to cause the pump 13 to supply fluid to the fluid motor 12, in a direction corresponding to the direction of movement of rod 16. As a result, motor 12 drives the gun 10 in a direction corresponding to the direction of movement of the telescope 11. The output shaft 32 of fluid motor 12 is connected through bevel gearing 33, shaft 34, bevel gearing 35 and shaft 36 to the input spider 20a of differential device 20, and through gearing 37, 38 to the gun. The ratio of this gearing is such that when the gun 10 has rotated through an angle equal to the angle through which the output shaft 21a of motor 21 has been rotated, the control rod 16 will have been returned to its off position and the gun 10 brought to rest in substantial correspondence with the motor shaft 21a. As pointed out in the foregoing, shaft 21a is driven in synchronism with telescope 11 and therefore the gun 10 is brought to rest in correspondence with the telescope 11.

In order to prevent oscillations or hunting, means 39 are provided for introducing a correction in the control responsive to the rate of change of torque of the driving means. In a closed hydraulic system comprising a fluid motor supplied from a pump, the torque of the fluid motor is a function of the fluid pressure of the system. Accordingly, the anti-hunting means 39 is made responsive to the rate of change of the pressure of the fluid supplied from pump 13 to motor 12. It comprises a pair of cylinders 40 and 41, each having a movable piston, and each having fluid connections from the spaces on opposite sides of the pistons to the fluid supply connections 42, 43 to motor 12. Thus, the cylinder 40 contains a movable piston 44 which is maintained by springs 45, 46 in a central position when no difference in fluid pressure exists across motor 12. Similarly, the cylinder 41 has a piston 47 which is maintained in central position by springs 48 and 49 when the pressure drop across fluid motor 12 is zero. The space above piston 44 and the space beneath piston 47 are connected by pipes 50 and 51 to the lower supply connection 43, and the space beneath piston 44 and the space above piston 47 are connected by means of pipes 52 and 53 with upper supply connection 42. Valves 54 and 55 are respectively connected in pipes 52 and 53 for restricting the flow in pipes 52 and 53 a desired amount. One of these valves is opened a greater amount than the other so that the rate of flow through the valves is different. It is assumed that valve 55 has the greater opening.

The two pistons 44 and 47 are connected to a mechanical differentiating system which responds only to the difference in position of the two pistons. Thus, when the steady state has been reached the two pistons come to rest at positions of equal displacement, both representing the fluid pressure of the system. However, one piston arrives at its steady state position faster than the other because of the difference in the restrictions of valves 54 and 55. The differential mechanical system will therefore respond only when there is a state of change of pressure.

The mechanical differentiating system is illustrated as comprising a lever 56 pivotally attached at each end to one of the pistons 44, 47 and pivotally attached at its center to end of lever 17 remote from control rod 16.

With the foregoing understanding of the apparatus and its organization in the system, the operation of the system itself will readily be understood from the following detailed description.

Assuming the system to be at rest with the gun 10 in a position of correspondence with the telescope 11, the control will be deenergized and the various parts in the positions in which they are illustrated. Rotation of telescope 11 energizes one or the other of the pair of electric valves 25, 26 depending on the direction of rotation and causes the motor 21 to rotate the shaft 21a in substantial synchronism with the telescope. Since the input spider 20a of the differential device 20 is, for the instant, held against rotation by the gun 10, the output element 20b of the differential is rotated causing the rack 18 to move and actuate the control rod 16 in a direction, for example downwardly, such as to cause fluid motor 12 to drive gun 10 toward correspondence with telescope 11. As the control rod is moved, the pressure of the fluid in the system rises very abruptly, almost instantaneously to a high value. This means that a very high torque is being applied to accelerate the mass of the gun. Now, if this high torque continues to be applied the gun 10 would be accelerated so rapidly that it would over-shoot the position of correspondence and thus give rise to a condition of hunting. However, as the pressure starts to rise, and assuming the upper connection 42 to be the high pressure side, the piston 44 starts to move upwardly and the piston 47 starts to move downwardly. Since the valve 55 is opened much wider than valve 54 piston 47 moves downwardly at a much greater rate than piston 44 moves upwardly. The effect of this difference in the rates of movement of the pistons is to displace the fulcrum point 56a downwardly and thereby to move the control rod 16 upwardly or in a direction opposite to that in which it was moved by motor 21. This of course reduces the volume of fluid supplied to motor 12 and thereby reduces the fluid pressure or torque of motor 12, and thereby prevents over-shooting.

At this point, it will be noted that immediately upon positional disagreement of the telescope and gun, the fluid pressure or motor torque rises quickly to a high value, and a time interval afterward the anti-hunting means 39 operates to oppose or reduce this rapid increase in torque.

As the fluid pressure approaches a steady value, the piston 47 is displaced from its central position an amount proportional to the pressure drop across the fluid motor 12. Since the piston 47 moves faster than piston 44, it arrives at its final displacement before piston 44. Thereafter, the piston 44 continues to move upwardly toward its final displacement, and the effect of this movement of piston 44 after piston 47 has ceased to move is to move the control rod 16 downwardly again thereby tending again to increase the fluid pressure and motor torque until the piston 44 has been displaced an amount equal to the displacement of piston 47. After the fluid pressure of the system has become steady both pistons 44 and 47 will be displaced equal amounts in opposite directions from their normal positions and the correction introduced in the control by the faster moving piston will have been completely subtracted by the slower moving piston. Thus, it will be seen that the anti-hunting mechanism does not introduce corrections under steady state conditions of fluid pressure or motor torque, but only introduces corrections when the pressure or torque is changing. These corrections are also proportional to the rate of change of pressure or motor torque.

As the gun 10 is accelerated by the torque of fluid motor 12, it begins to catch up with the shaft 21a, thereby rotating the output gear 20b in the reverse direction, raising the control rod 16 and decelerating the motor 12 and load 10. This will again bring about changes in the pressure and torque to which the anti-hunting means will respond to introduce the necessary correction.

The movements of the pistons 44 and 47 in response to pressure and torque changes under varying conditions of speed, acceleration and deceleration are sometimes extremely complex. The action described in the foregoing is merely one example of many possible. In general, when the control functions and brings about a change in the pressure and torque conditions, the anti-hunting mechanism acts after a time interval to introduce a correction responsively to the rate of change of torque opposing the action of the control and subsequently subtracts the correction so introduced.

Although in accordance with the provision of the patent statutes, this invention is described as embodied in concrete form, it will be understood that the apparatus and connections shown are merely illustrative and that the invuention is not limited thereto since alterations and modifications will readily suggest themselves to persons skilled in the art without departing from the spirit of this invention or from the scope of the annexed claims.

What I claim as new and desire to secure by Letters Patent of the United States is:

1. In combination with a pilot device and driven object, hydraulic driving means for said object comprising a fluid motor connected to said object, means for supplying fluid under pressure to said motor, means responsive to positional disagreement of said device and object for controlling the supply of fluid to said motor, and anti-hunting means responsive to rate of change of torque of said driving means for controlling the supply of fluid to said motor.

2. In a follow-up system for driving an object in positional agreement with a pilot device, driving means for said object comprising a fluid motor connected to said object, a pump for supplying fluid under pressure to said motor, means responsive to positional disagreement of said device and object for controlling the supply of fluid to said motor to cause said motor to drive said object toward correspondence with said device, and anti-hunting means responsive to rate of change of the pressure of said fluid for controlling the supply of fluid to said motor.

3. In a follow-up system for driving an object in positional agreement with a pilot device, driving means for said object comprising a fluid motor connected to said object, a pump for supplying fluid under pressure to said motor, means for controlling the supply of fluid to said motor, means responsive to positional disagreement of said device and object for actuating said control means to cause said motor to drive said object toward correspondence with said device, and anti-hunting means responsive to rate of change of torque of said driving means for effecting a reverse operation of said control means a time interval after actuation thereof by said positional disagreement responsive means.

4. A follow-up control system comprising in combination a pilot device, a driven object, driving means for said object comprising a fluid motor connected to said object and a pump for supplying fluid under pressure to said motor, a device for controlling the supply of fluid to said motor, means responsive to positional disagreement of said pilot device and driven object for actuating said control device to cause said motor to drive said object toward correspondence with said pilot device and means responsive to rate of change of the pressure of said fluid for producing a reverse actuation of said control device an interval of time after actuation thereof by said positional disagreement responsive means.

5. A follow-up system comprising in combination a pilot device, a driven object, driving means for said object comprising a fluid motor connected to said object and a pump for supplying fluid to said motor, a device for controlling the supply of fluid to said motor, means responsive to positional disagreement of said pilot device and driven object for actuating said control device to cause said motor to drive said object toward positional agreement with said pilot device, and anti-hunting means comprising a cylinder and a piston movable therein in response to the pressure of said fluid for producing a reverse actuation of said control device a time interval after actuation thereof by said positional disagreement responsive means.

6. Means for reproducing position comprising a pilot device, a driven object, driving means for said object comprising a fluid motor connected to said object and a pump for supplying fluid to said motor, a device for controlling said pump to control the rate of supply of fluid to said motor, means responsive to positional disagreement of said object and pilot device for actuating said control device to cause said motor to drive said object toward correspondence with said pilot device and anti-hunting means for effecting a reverse actuation of said control device a time interval after actuation thereof by said disagreement responsive means comprising a cylinder having communication with said fluid supply, a piston movable in said cylinder in response to the pressure of said fluid and means for restricting the flow of fluid to said cylinder to control the rate of movement of said piston.

7. A follow-up control system comprising in combination a pilot device, a driven object, hydraulic driving means for said object comprising a fluid motor connected to said object and a pump for supplying fluid to said motor, a device for controlling the rate of supply of fluid to said motor, means responsive to positional disagreement of said device and object for actuating said control device to cause said motor to drive said object toward correspondence with said pilot device, and anti-hunting means comprising a cylinder and a piston movable therein in response to the pressure of said fluid for effecting a reverse actuation of said control device a time interval after actuation thereof by said positional disagreement responsive means and a second cylinder having a piston movable therein in response to pressure of said fluid and connected to said control device for subsequently counteracting the effect of said first piston.

8. A follow-up system for driving an object in positional agreement with a pilot device comprising a fluid motor connected to said object, a pump and fluid supply connections from said pump to said motor, a device for controlling the supply of fluid to said motor, means responsive to positional disagreement of said pilot device and driven object for actuating said control device to cause said motor to drive said object toward correspondence with said pilot device, and anti-hunting means for actuating said control device comprising a pair of cylinders, each having a piston movable therein in response to the pressure of said fluid, means for causing said pistons to move at different rates, and a mechanical differentiating connection between said pistons and said control device for effecting actuation of said control device in response to the difference in position of said pistons.

9. A follow-up control system for driving an object in positional agreement with a pilot device comprising a fluid motor connected to drive said object, a pump for supplying fluid to said motor, a device for controlling the supply of fluid to said motor, means responsive to positional disagreement of said pilot device and object for actuating said control device to cause said motor to drive said object toward correspondence with said pilot device, and anti-hunting means for producing an opposite actuation of said control device an interval of time after actuation thereof by said disagreement responsive means comprising a pair of cylinders having connections to said fluid system and having pistons movable in response to pressure of said liquid, flow-restricting means in said connections to provide for movement of said pistons at different rates and a mechanical differentiating connection between said pistons and said control device thereby to introduce an anti-hunting correction substantially solely in response to rate of change of fluid pressure.

10. A hydraulic power system, comprising a fluid motor, a pump to supply fluid under pressure to said motor, a device for controlling the output of said pump, and means responsive to rate of change of the pressure of said fluid for producing reverse actuation of said control device an interval of time after actuation thereof.

11. A hydraulic power system, comprising a fluid motor, a pump to supply fluid under pressure to said motor, a pair of cylinders, a resiliently balanced piston in each cylinder, means connecting said cylinders to the fluid supply between said pump and said motor to move said pistons differentially in response to rate of change of pressure in said fluid supply, and means actuated in common by said pistons to control the supply of fluid to said motor by said pump.

12. A hydraulic power system, comprising a fluid motor, a pump to supply fluid under pressure to said motor, and anti-hunting means responsive to rate of change of torque of said motor for controlling the supply of fluid to said motor.

ERNST F. W. ALEXANDERSON.